US007753436B2

(12) United States Patent
Kim et al.

(10) Patent No.: US 7,753,436 B2
(45) Date of Patent: Jul. 13, 2010

(54) OPERATOR CAB FOR HEAVY EQUIPMENT

(75) Inventors: Kang Tae Kim, Changwon (KR); Hideo Kosaka, Onomichi (JP); Yasushi Uchida, Onomichi (JP)

(73) Assignees: Volvo Construction Equipment Holding Sweden AB, Eskilstuna (SE); Press Kogyo Co., Ltd., Kanagawa-Ken (JP)

( * ) Notice: Subject to any disclaimer, the term of this patent is extended or adjusted under 35 U.S.C. 154(b) by 236 days.

(21) Appl. No.: 11/636,278

(22) Filed: Dec. 8, 2006

(65) Prior Publication Data
US 2008/0129085 A1 Jun. 5, 2008

(30) Foreign Application Priority Data
Nov. 30, 2006 (KR) .................... 10-2006-0119936

(51) Int. Cl.
*B60J 5/06* (2006.01)
(52) U.S. Cl. .................... 296/155; 49/225; 49/360; 296/190.11; 296/207
(58) Field of Classification Search .............. 16/82, 16/85, 86, 86 A, 86 B; 49/41, 209, 211, 213, 49/216, 218, 219, 221, 223, 225, 360; 105/332, 105/339; 180/89.12; 292/340, DIG. 46; 296/146.1, 146.9, 155, 190.11, 207
See application file for complete search history.

(56) References Cited
U.S. PATENT DOCUMENTS

| | | | | | |
|---|---|---|---|---|---|
| 1,768,458 | A | * | 6/1930 | Wells | 16/85 |
| 4,433,507 | A | * | 2/1984 | Chikaraishi | 49/213 |
| 4,502,246 | A | * | 3/1985 | Minami | 49/322 |
| 5,577,795 | A | * | 11/1996 | Shinsen | 296/190.11 |
| 5,802,671 | A | * | 9/1998 | Ikuma | 16/85 |
| 5,895,089 | A | * | 4/1999 | Singh et al. | 296/207 |
| 5,906,026 | A | * | 5/1999 | Junttila | 16/85 |
| 6,036,257 | A | * | 3/2000 | Manuel | 296/155 |
| 6,611,990 | B1 | * | 9/2003 | Sogo et al. | 16/87 R |
| 7,121,603 | B2 | * | 10/2006 | Stevenson et al. | 296/26.09 |

(Continued)

FOREIGN PATENT DOCUMENTS
JP 63305025 A * 12/1988

*Primary Examiner*—Glenn Dayoan
*Assistant Examiner*—Paul A Chenevert
(74) *Attorney, Agent, or Firm*—Ladas & Parry LLP

(57) ABSTRACT

An operator cab for heavy equipment is described to prevent a sliding door mounted on the cab from rocking or rattling in X, Y, and Z-axis directions due to a shock or vibration applied to the cab in a state that the sliding door is fully opened. The operator cab includes an outer sidewall having a doorway formed thereon; upper and lower rails provided on upper and lower portions of the outer sidewall and engaged with upper and lower rollers; a sliding door being slid by upper and lower rollers engaged with the upper and lower rails; an upper pad formed on an upper bracket; a lower pad formed on a lower bracket; an upper stopper, installed in the opened position of the outer sidewall, for being in surface contact with the upper pad when the sliding door is fully opened, and preventing the sliding door from rocking when the upper stopper becomes in surface contact with the upper pad; and a lower stopper, installed in the opened position of the outer sidewall, for being in surface contact with the lower pad when the sliding door is fully opened, and preventing the sliding door from rocking when the lower stopper becomes in surface contact with the lower pad.

31 Claims, 16 Drawing Sheets

U.S. PATENT DOCUMENTS 7,137,662 B2 * 11/2006 Nakayama et al. ..... 296/190.11
7,360,823 B2 * 4/2008 Nakayama et al. ..... 296/190.11
2008/0106120 A1 * 5/2008 Kim et al. .............. 296/190.11

* cited by examiner

OPERATOR CAB FOR HEAVY EQUIPMENT

CROSS-REFERENCE TO RELATED APPLICATION

This application is based on and claims priority from Korean Patent Application No. 10-2006-0119936, filed on Nov. 30, 2006 in the Korean Intellectual Property Office, the disclosure of which is incorporated herein in its entirety by reference.

BACKGROUND OF THE INVENTION

1. Field of the Invention

The present invention relates to an operator cab for heavy equipment capable of preventing a sliding door from rocking or rattling due to vibration and so on being transferred to the cab in a state that the sliding door mounted on the cab is fully opened.

More particularly, the present invention relates to an operator cab for heavy equipment capable of preventing a sliding door from rocking or rattling in X, Y, and Z-axis directions due to a shock or vibration applied to the cab when the sliding door is in an open state.

Here, the X-axis direction as described above means a forward/backward direction of the cab (i.e., a direction in which the sliding door is opened/closed), the Y-axis direction means a right/left direction of the cab, and the Z-axis direction means an upward/downward direction of the cab.

2. Description of the Prior Art

Generally, it is frequent that common heavy construction equipment such as an excavator is operated with its door kept open in order to secure the operator's view and to ventilate an operator cab during the operation of the equipment. During a swinging operation of the equipment in a state that a hinge type door of the cab is kept open in a narrow or limited working environment such as a downtown area, unexpected collision or bumping with external obstructive objects such as buildings, trees, and so forth, may occur.

In order to solve this problem, as shown in FIG. 1, an operator cab having a sliding door mounted thereon has been used to reduce the swing radius of the cab. This operator cab has been proposed in such a way that an outer sidewall of the cab that includes the sliding door is in an arc shape, and the position of the sliding door remains within the swing radius of the cab when the door is opened.

As illustrated in FIGS. 1 to 3d, a conventional operator cab 2 having a sliding door 3 slidably installed on an outer sidewall 2a, which is disclosed in U.S. Pat. No. 5,577,795, includes a plurality of rails 4, 5, and 6 respectively provided on upper, lower, and central parts of the outer sidewall 2a; a plurality of rollers 7, 8, and 9, mounted on the door 3, for supporting the door 3 when the door 3 is slid between a closed position, in which a doorway 2b is closed, and a fully-opened position, in which the doorway is open; and a plurality of pairs of strikers, each pair including female strikers 10 and 12 and male strikers 11 and 13, one of the strikers of each pair being mounted on the door 3 and the other being mounted on the outer sidewall 2a such that at least one pair of strikers are engaged with each other when the door 3 is in its closed position and at least one pair of strikers are engaged with each other when the door 3 is in its fully-opened position. At least one of the pairs of strikers is mounted in such a way that the strikers are engaged with each other at a front edge portion of the door 3 when the door is fully opened, and at least the other of the pairs of strikers is mounted in such a way that the strikers are engaged with each other at a rear edge portion of the door 3 when the door is fully closed. 18 denotes a door lock.

In particular, as shown in FIG. 2, the upper roller 7 includes a guide roller 7a that moves along the upper rail 4 when the door 3 is slid, and the lower roller 8 includes a rolling roller 8a which is rotated in an X-axis direction, moving along the lower rail 5, to support the load of the door 3 when the door 3 is slid, and a guide roller 8b which is rotated in a Y-axis direction to prevent the door 3 from being released from the lower rail 5.

As shown in FIG. 3c, the central roller 9 of the door 3 includes a rolling roller 9a which is rotated in an X-axis direction to support the load of the door 3 when the door 3 is slid, and a guide roller 9b which is rotated in a Y-axis direction to prevent the door 3 from being released from the central rail 6 when the sliding door 3 is slid.

In the case where the excavator is driven when the door 3 is fully opened or closed, the door 3 is rocked left and right or rattles upward and downward due to the shock or vibration applied to the cab 2. As a result, an operator cannot concentrate upon his work to lower the operation efficiency and to cause the occurrence of a safety accident.

Taking the above problems into consideration, a plurality of male and female strikers 10, 11, 12, 13, 14, and 15 are provided on the door 3 and the cab 2 and are engaged with each other, as shown in FIGS. 1 and 2, so as to prevent the door 3 from rocking or rattling due to the vibration being transferred to the cab 2 and to detachably support the door 3, when the excavator works in a state that the door 3 is fully opened (see FIG. 3b) or is closed (see FIG. 3a).

As shown in FIG. 1, locking strikers 16 and 17 are installed on the door 3 and the cab 2, respectively, so as to lock the door 3 in its opened or closed position. Specifically, the locking striker 16 is installed in a position adjacent to a doorway 2b, and the locking striker 17 is installed in a position that gets away from the doorway 2b.

According to the structure of the conventional cab for heavy equipment as described above, the plurality of male and female strikers 10, 11, 12, 13, 14, and 15 (see FIGS. 1 and 2) and the locking strikers 16 and 17 (see FIG. 1) are installed on the cab 2 and the door 3, respectively, so as to keep the door 3 in a fully-opened or closed state with respect to the cab 2. This causes the number of components and their assembling time and process to be increased with the cost raised. Accordingly, the production efficiency and the price competitiveness thereof are lowered.

In addition, since the strikers 10, 11, 12, 13, 14, and 15 and the locking strikers 16 and 17, which are installed on the cab 2 and the door 3, are outwardly exposed from the door 3, the external appearance of the heavy equipment deteriorates.

In the case of fixing the door 3 to the cab 2 in the opened state, as shown in FIG. 3d, the shock or vibration generated in a direction in which the door 3 is opened (i.e., X-axis direction in the drawing) can be absorbed or suppressed by the structure of the male and female strikers 14 and 15.

However, the shock or vibration generated in the upward/downward direction of the door 3 (i.e., Z-axis direction in the drawing) cannot be effectively suppressed. Also, the shock or vibration generated in the right/left direction of the door 3 (i.e., Y-axis direction in the drawing) cannot be effectively suppressed.

In addition, since the male and female strikers 14 and 15 for fixing the door 3 in the opened state are large-sized and are greatly protruded outward, the external appearance of the heavy equipment deteriorates.

SUMMARY OF THE INVENTION

Accordingly, the present invention has been made to solve the above-mentioned problems occurring in the prior art while advantages achieved by the prior art are maintained intact.

One object of the present invention is to provide an operator cab for heavy equipment capable of preventing a sliding door mounted on the cab from rocking or rattling in three directions (i.e., X, Y, and Z-axis directions) due to a shock or vibration being applied to the cab in a state that the sliding door is fully opened or closed, so that an operator can concentrate upon his work.

Another object of the present invention is to provide an operator cab for heavy equipment capable of increasing a fixing force caused by mutual surface contact between stoppers and pads for preventing the rocking of a sliding door and preventing the rocking of the sliding door due to a gap of rollers.

Still another object of the present invention is to provide an operator cab for heavy equipment capable of reducing the wear of rollers and thus improving the durability of the rollers by dispersing the load applying to the rollers when a sliding door is opened.

Still another object of the present invention is to provide an operator cab for heavy equipment capable of minutely changing the fixing position of stoppers when the manufacturing deviation occurs between the operator cab and a sliding door or stopper pads are worn away.

Still another object of the present invention is to provide an operator cab for heavy equipment capable of simplifying the structure of the stoppers to reduce their manufacturing cost, and minimizing protrusion of the stoppers outside the operator cab.

In order to accomplish these objects, there is provided an operator cab for heavy equipment, according to an embodiment of the present invention, which includes an outer sidewall having a doorway formed thereon; upper and lower rails provided on upper and lower portions of the outer sidewall and engaged with upper and lower rollers, respectively; a sliding door being slid by upper and lower rollers that are engaged with the upper and lower rails, respectively, to open or close the doorway; an upper pad formed on an upper bracket which is fixed to an inner surface of the sliding door and on which the upper roller is rotatively mounted; a lower pad formed on a lower bracket which is fixed to the inner surface of the sliding door and on which the lower roller is rotatively mounted; an upper stopper, installed in the opened position of the outer sidewall in which the sliding door is fully opened, for being in surface contact with the upper pad when the sliding door is fully opened, and preventing the sliding door from rocking by pressure of a pad elastically supported to produce a displacement in an X-axis direction when the upper stopper becomes in surface contact with the upper pad; and a lower stopper, installed in the opened position of the outer sidewall in which the sliding door is fully opened, for being in surface contact with the lower pad when the sliding door is fully opened, and preventing the sliding door from rocking by pressure of a pad elastically supported to produce a displacement in the X-axis direction when the lower stopper becomes in surface contact with the lower pad.

According to another aspect of the present invention, there is provided an operator cab for heavy equipment, which includes an outer sidewall having a doorway formed thereon; upper, central, and lower rails provided on upper, central, and lower portions of the outer sidewall and engaged with upper, central, and lower rollers, respectively; a sliding door being slid by upper, central, and lower rollers that are engaged with the upper, central, and lower rails, respectively, to open or close the doorway; an upper pad formed on an upper bracket which is fixed to an inner surface of the sliding door and on which the upper roller is rotatively mounted; a central pad formed on a central bracket which is fixed to the inner surface of the sliding door and on which the central roller is rotatively mounted; a lower pad formed on a lower bracket which is fixed to the inner surface of the sliding door and on which the lower roller is rotatively mounted; an upper stopper, installed in the opened position of the outer sidewall in which the sliding door is fully opened, for being in surface contact with the upper pad when the sliding door is fully opened, and preventing the sliding door from rocking by pressure of a pad elastically supported to produce a displacement in an X-axis direction when the upper stopper becomes in surface contact with the upper pad; a central stopper, installed in the opened position of the outer sidewall in which the sliding door is fully opened, for being in surface contact with the central pad when the sliding door is fully opened, and preventing the sliding door from rocking by pressure of a pad elastically supported to produce a displacement in the X-axis direction when the central stopper becomes in surface contact with the central pad; and a lower stopper, installed in the opened position of the outer sidewall in which the sliding door is fully opened, for being in surface contact with the lower pad when the sliding door is fully opened, and preventing the sliding door from rocking by pressure of a pad elastically supported to produce a displacement in the X-axis direction when the lower stopper becomes in surface contact with the lower pad.

At least one of the upper, central, and lower stoppers may include a case mounted on the outer sidewall; a pad being movably engaged with a guide bar fixed to penetrate the case, and having an upper surface upwardly inclined in a direction in which the sliding door is opened; and elastic members installed on outer surfaces of the guide bar in forward and backward directions of the pad to fix the sliding door by pressing the pad being in surface contact with any one of the upper, central, and lower pads by their elastic restoring forces when the sliding door is fully opened.

The number of the upper, central, and lower stoppers installed on the outer sidewall may correspond to the number of the upper, central, and lower rollers.

The upper stopper may be installed to press the upper pad in X and Y-axis directions through the pad, when the sliding door is fully opened, to prevent the sliding door from rocking in the X and Y-axis directions.

The lower stopper may include a first lower stopper installed to press a first lower pad in X and Z-axis directions through the pad, when the sliding door is fully opened, to prevent the sliding door from rocking in the X and Z-axis directions; and a second lower stopper installed to press a second lower pad in X and Y-axis directions through the pad, when the sliding door is fully opened, to prevent the sliding door from rocking in the X and Y-axis directions.

The central stopper may include a first central pad installed to press a first central roller in X and Z-axis directions through the pad, when the sliding door is fully opened, to prevent the sliding door from rocking in the X and Z-axis directions; and a second central stopper installed to press a second central pad in X and Y-axis directions through the pad, when the sliding door is fully opened, to prevent the sliding door from rocking in the X and Y-axis directions.

The case may be provided with a bracket for fixing the case to the outer sidewall, which has elongated fastening holes formed thereon so as to move at least one of the upper, central, and lower stoppers in the X or Z-axis direction against the outer sidewall to fix the stopper to the outer sidewall.

The operator cab may further include a supporter, installed on an upper or lower portion of the outer sidewall, for being in surface contact with the sliding door, when the sliding door is fully opened, to prevent the sliding door from rocking in the X-axis direction.

The operator cab may further include a stopper bar holder formed on an inner rear surface of the sliding door; a stopper bar installed on the outer sidewall, for being engaged with the stopper bar holder when the sliding door is fully opened, and locking the stopper bar holder, when the sliding door is fully opened, to prevent the sliding door from rocking in the X and Y-axis directions; and a lock striker, installed adjacent to the stopper bar, for being locked by a locking plate installed on the sliding door when the sliding door is fully opened.

The case may further include a pair of partition members, formed to correspond to the right and left directions of the case around the guide bar, for guiding a rectilineal movement of the pad in the X-axis direction if any one of the upper and lower pads becomes in surface contact with the slant surface of the pad due to the movement of the sliding door.

The stopper bar holder may be made of a plastic material. The pad may be made of a plastic material. The supporter may be made of a plastic material.

The upper, central, and lower pads may be made of a metallic material.

The elastic members may be respectively installed on the guide bar in the backward and forward directions of the pad.

The elastic members may be installed on the guide bar in the direction in which the pad is pressed.

The elastic members may be installed on the guide bar in the forward and backward directions of the pad in such a manner that the elastic member installed in the forward direction of the pad has a strength relatively higher than the elastic member installed in the backward direction of the pad, and is installed on a part of the guide bar in the forward direction of the pad.

At least one of both ends of the upper, central, or lower pad is bent so that the upper, central, or lower pad smoothly slides when it becomes in surface contact with the pad.

The upper stopper is installed at an inner end portion of the upper rail of the opened position in which the sliding door is fully opened, the central stopper is installed at an inner end portion of the central rail of the opened position in which the sliding door is fully opened, and the lower stopper is installed at an inner end portion of the lower rail of the opened position in which the sliding door is fully opened.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
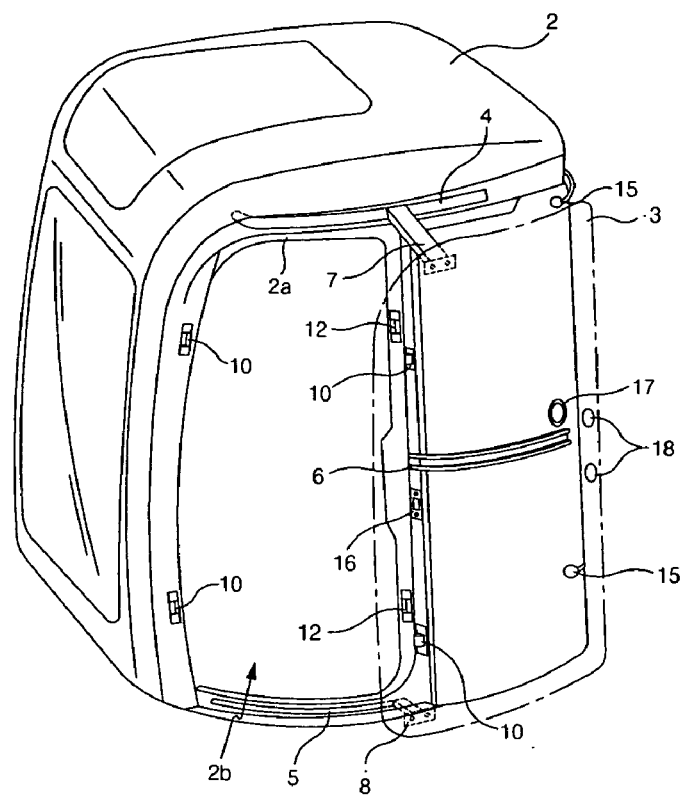
FIG. 1 is a perspective view of a conventional cab for heavy equipment.
Figure 2:
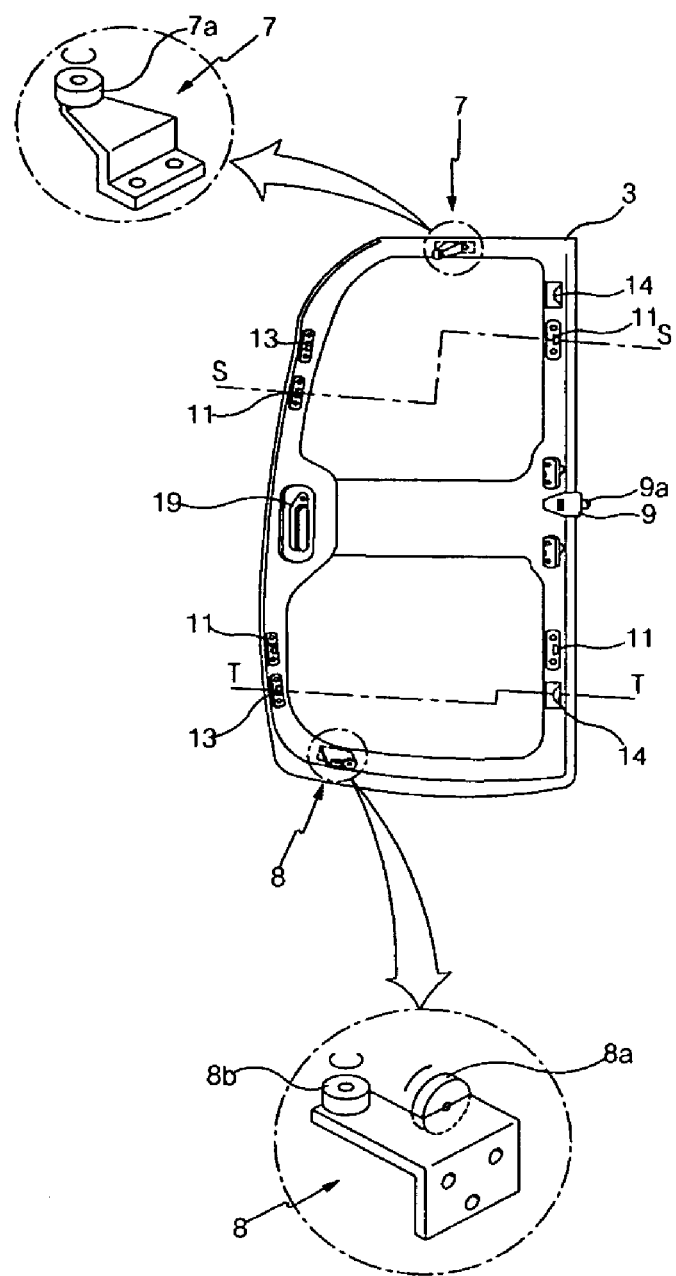
FIG. 2 is a side view of the sliding door shown in FIG. 1.
Figure 3A:
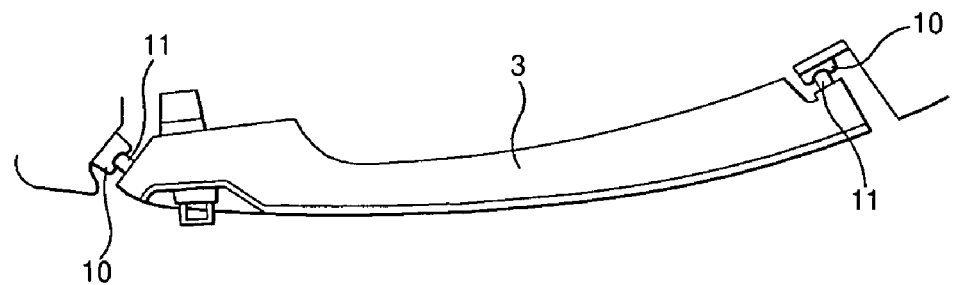
FIG. 3a is a cross-sectional view taken along line S-S in FIG. 2, showing the sliding door in a closed state.
Figure 3B:
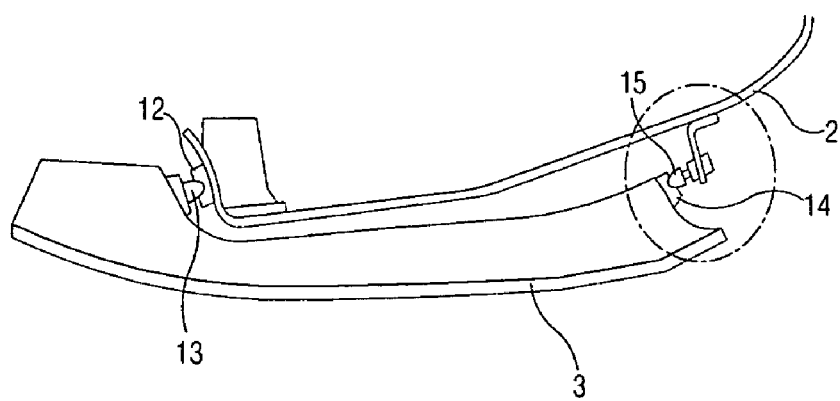
FIG. 3b is a cross-sectional view taken along line T-T in FIG. 2, showing the sliding door in an opened state.
Figure 3C:
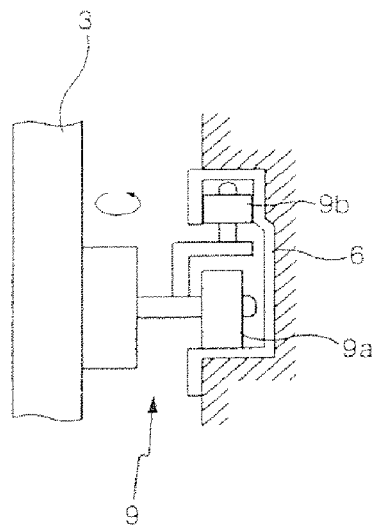
FIG. 3c is a cross-sectional view of a central rail and a central roller shown in FIG. 1.
Figure 3D:
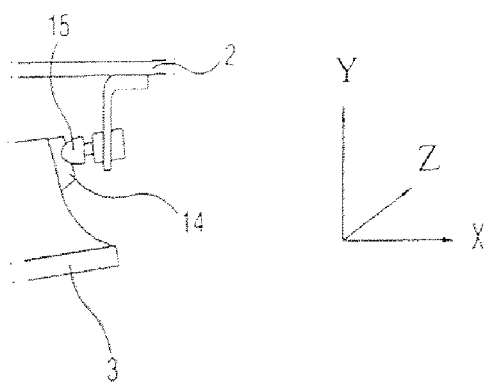
FIG. 3d is an enlarged view of a part indicated by a circle shown in FIG. 3b.

Hereinafter, a preferred embodiment of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

In FIGS. 4a, 4b, 4c, 5, 6a, 6b, 8a, 8b, and 9, an operator cab for heavy equipment according to an embodiment of the present invention is illustrated. When a sliding door 3 is fully opened, it is prevented from rocking by an upper stopper 21 and a lower stopper 23.

The operator cab 2 according to an embodiment of the present invention includes an outer sidewall 2a having a doorway 2b formed thereon and an outer surface that is in an arc shape; upper and lower rails 4 and 5 provided on upper and lower portions of the outer sidewall 2a, and engaged with upper rollers 7 and 7a and lower rollers 8, 8a and 8b, respectively; and a sliding door 3 being slid by upper and lower rollers 7 and 8 that are engaged with the upper and lower rails 4 and 5, respectively, to open or close the doorway 2b.

The operator cab 2 further includes an upper bracket 7c which is fixed to an inner surface of the sliding door 3 and on which the upper roller 7 is rotatively mounted, and an upper pad 7d made of a metallic material in the form of a plate and slantly formed on the side surface (i.e., the inner side surface adjacent to the outer sidewall 2a) of the upper bracket 7c; and a lower bracket 8c which is fixed to the inner surface of the sliding door 3 and on which the lower roller 8 is rotatively mounted, and first and second lower pads 8d and 8e made of a metallic material in the form of a plate and slantly formed on the side surface (i.e., the inner side surface adjacent to the lower rail 5) of the lower bracket 8c.

The operator cab 2 further includes an upper stopper 21, installed in the opened position of the outer sidewall 2a in which the sliding door 3 is fully opened, for being in surface contact with the upper pad 7d when the sliding door is fully opened, and preventing the sliding door 3 from rocking by pressure of a pad 20 elastically supported to produce a displacement in an X-axis direction when the upper stopper 21 becomes in surface contact with the upper pad 7d; and a pair of lower stoppers 23, 23a and 23b, installed in the opened position of the outer sidewall 2a in which the sliding door 3 is fully opened, for being in surface contact with the first and second lower pads 8d and 8e when the sliding door 3 is fully opened, and preventing the sliding door 3 from rocking by pressure of a pad 20 elastically supported to produce a displacement in the X-axis direction when the lower stoppers become in surface contact with the first and second lower pads 8d and 8e.

At least one of both ends of the upper pad 7d and the first and second lower pads 8d and 8e is bent so as to smoothly slide when it becomes in surface contact with the pad 20.

The operator cab 2 further includes a supporter 32, installed on an upper or lower portion of the outer sidewall 2a, for being in surface contact with the side surface of the sliding door 3, when the sliding door 3 is fully opened, to prevent the sliding door 3 from rocking in the Y-axis direction.

The operator cab 2 further includes a stopper bar holder 33 formed on an inner rear surface of the sliding door 3 and having engaging members 33a formed on upper and lower portions thereof, the engaging members being "⊂"-shaped and being made of a plastic material; a stopper bar 34 installed on the outer sidewall 2a, for being engaged with the engaging member 33a when the sliding door 3 is fully opened, and locking the stopper bar holder 33, when the sliding door is fully opened, to prevent the sliding door 3 from rocking in the X and Y-axis directions; and a lock striker 40, installed adjacent to the stopper bar 34, for being locked by a locking plate (not illustrated) installed on the sliding door 3 when the sliding door 3 is fully opened.

The stopper bar holder 33 is installed on the central portions of the sliding door 3 in a vertical direction, and the stopper bar 34 is installed in a portion of the outer sidewall 2a that gets away from the doorway 2b, when the sliding door 3 is fully opened, to lock the sliding door 3 at its opened position.

In FIGS. 4a, 4b, 4c, 6a, 6b, 7a, 7b, 8a, 8b, 9, and 11, an operator cab for heavy equipment according to another embodiment of the present invention is illustrated. When a sliding door 3 is fully opened, it is prevented from rocking by an upper stopper 21, a central stopper 22, and a lower stopper 23.

The operator cab 2 according to another embodiment of the present invention includes an outer sidewall 2a having a doorway 2b formed thereon and an outer surface that is in an arc shape; upper, central, and lower rails 4, 6, and 5 provided on upper, central, and lower portions of the outer sidewall 2a, and engaged with upper rollers 7 and 7a, central rollers 9, 9a and 9b, and lower rollers 8, 8a, and 8b, respectively; and a sliding door 3 being slid by the upper, central, and lower rollers 7, 9, and 8 that are engaged with the upper, central, and lower rails 4, 6, and 5, respectively, to open or close the doorway 2b.

The operator cab 2 further includes an upper bracket 7c which is fixed to an inner surface of the sliding door 3 and on which the upper roller 7 is rotatively mounted, and an upper pad 7d made of a metallic material in the form of a plate and slantly formed on the side surface (i.e., the inner side surface adjacent to the outer sidewall 2a) of the upper bracket 7c; a central bracket 9c which is fixed to the inner surface of the sliding door 3 and on which the central roller 9 is rotatively mounted, and first and second central pads 9d and 9e made of a metallic material in the form of a plate and slantly formed on the side surface (i.e., the inner side surface adjacent to the central rail 6) of the central bracket 9c; and a lower bracket 8c which is fixed to the inner surface of the sliding door 3 and on which the lower roller 8 is rotatively mounted, and first and second lower pads 8d and 8e made of a metallic material in the form of a plate and slantly formed on the side surface (i.e., the inner side surface adjacent to the lower rail 5) of the lower bracket 8c.

The operator cab 2 further includes an upper stopper 21, installed in the opened position of the outer sidewall 2a in which the sliding door 3 is fully opened, for being in surface contact with the upper pad 7d when the sliding door is fully opened, and preventing the sliding door 3 from rocking by pressure of a pad 20 elastically supported to produce a displacement in an X-axis direction when the upper stopper 21 becomes in surface contact with the upper pad 7d; a pair of central stoppers 22, 22a and 22b, installed in the opened position of the outer sidewall 2a in which the sliding door 3 is fully opened, for being in surface contact with the first and second central pads 9d and 9e when the sliding door 3 is fully opened, and preventing the sliding door 3 from rocking by pressure of a pad 20 elastically supported to produce a displacement in the X-axis direction when the central stoppers become in surface contact with the first and second central pads 9d and 9e; and a pair of lower stoppers 23, 23a and 23b, installed in the opened position of the outer sidewall 2a in which the sliding door 3 is fully opened, for being in surface contact with the first and second lower pads 8d and 8e when the sliding door 3 is fully opened, and preventing the sliding door 3 from rocking by pressure of a pad 20 elastically supported to produce a displacement in the X-axis direction when the lower stoppers become in surface contact with the first and second lower pads 8d and 8e.

At least one of both ends of the upper pad 7d, the first and second central pads 9d and 9e, and the first and second lower pads 8d and 8e is bent so as to smoothly slide when it becomes in surface contact with the pad 20.

In this case, since a stopper bar holder 33 formed on the inner rear surface of the sliding door 3, a stopper bar 34, installed on the outer sidewall 2a, for being engaged with the stopper bar holder 33, and a lock striker 40, installed adjacent to the stopper bar 34, for being locked by a locking plate (not illustrated) installed on the sliding door 3, are applied in the same manner as those in one embodiment of the present invention, the detailed description thereof will be omitted, and the same drawing reference numerals will be used for the same elements across various figures.

Figure 4A:
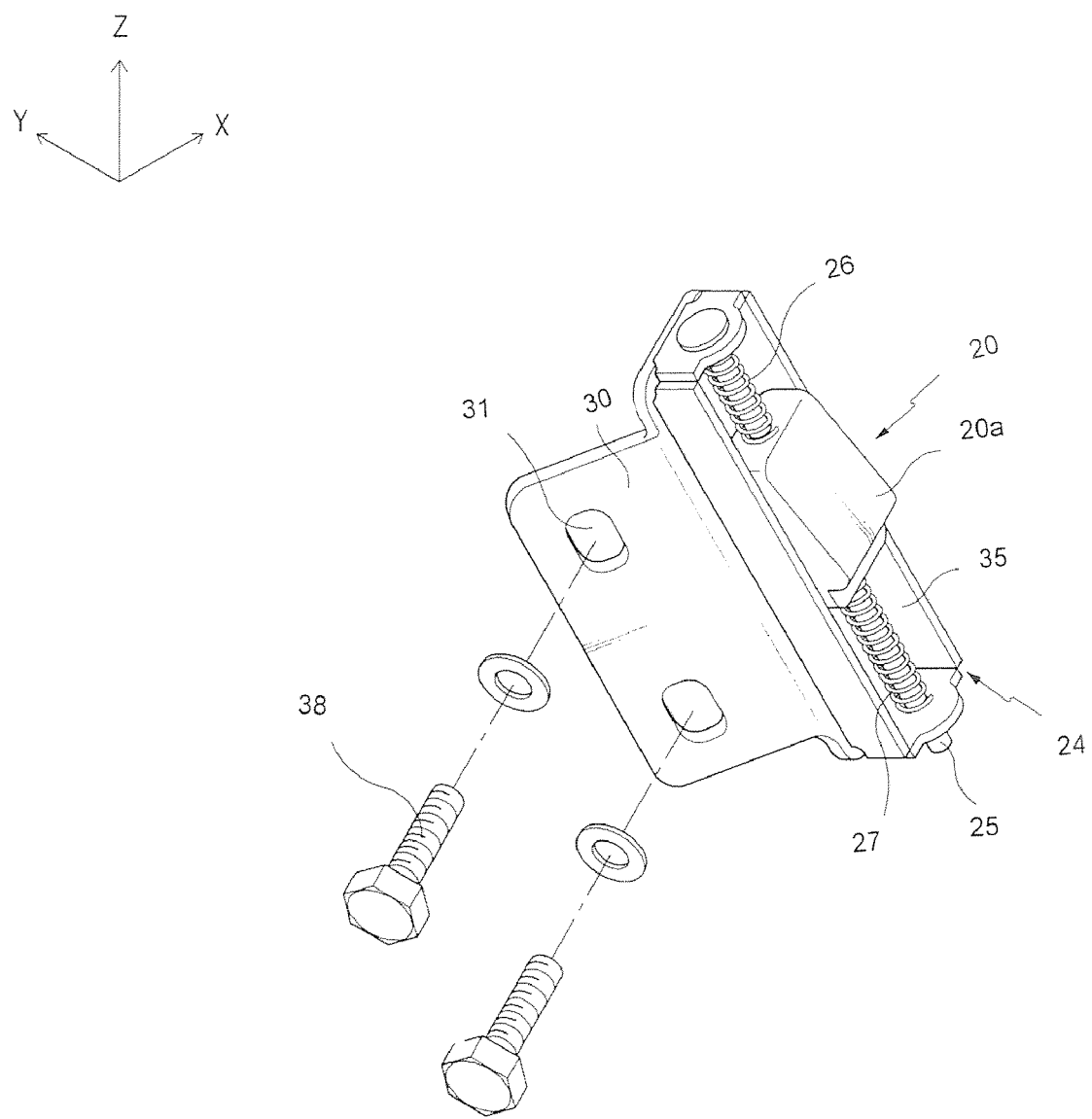
FIG. 4a is a perspective view of a stopper mounted on an operator cab for heavy equipment according to an embodiment of the present invention.

At least one of the upper, central, and lower stoppers 21, 22, and 23, as shown in FIG. 4a, includes a case 24 mounted on the outer sidewall 2a; a pad 20 being movably engaged with a guide bar 25 fixed to penetrate the case 24, and having a slant surface 20a upwardly formed in a direction in which the sliding door 3 is opened; and elastic members 26 and 27 (e.g., compression coil springs) installed on outer surfaces of the guide bar 25 in forward and backward directions of the pad 20 by pressing the pad 20 being in surface contact with any one of the upper pad 7d, the first and second central pads 9d and 9e, and the first and second lower pads 8d and 8e by their elastic restoring forces when the sliding door is fully opened.

Figure 4B:
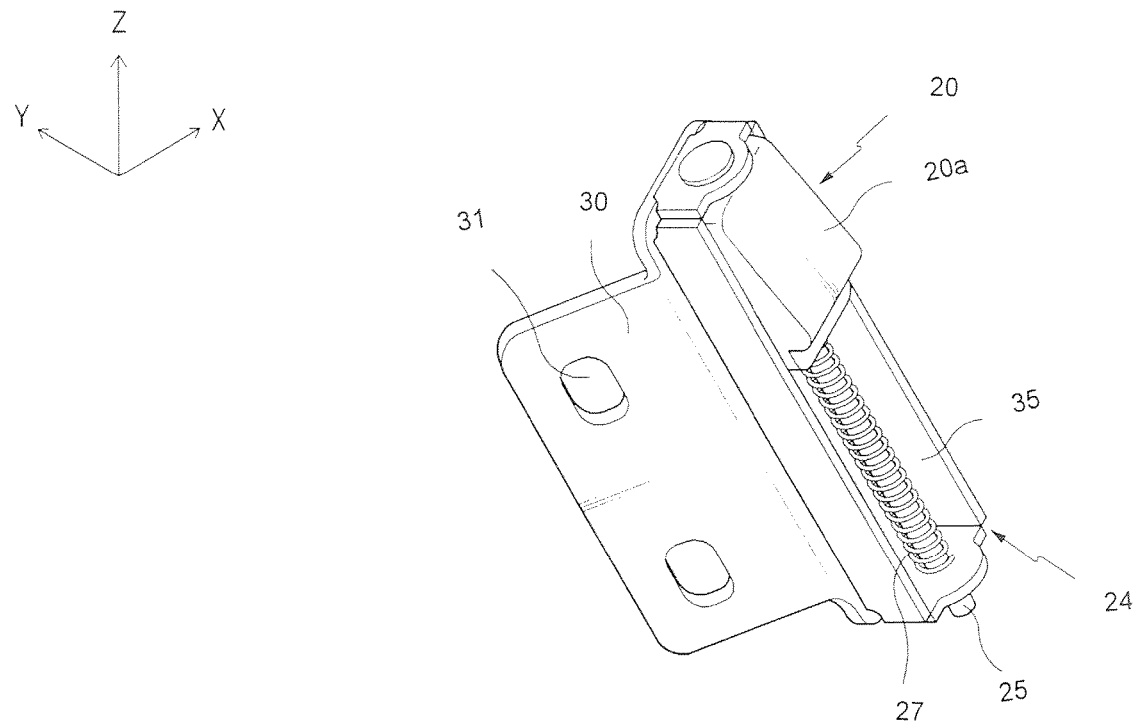
FIG. 4b is an exemplary view illustrating a modified stopper mounted on an operator cab for heavy equipment according to an embodiment of the present invention.

As shown in FIG. 4b, after the sliding door 3 is locked in the opened position in which the sliding door 3 is fully opened, the pad 20 produces no displacement any more in the X-axis direction. Due to this, the elastic member 27 may be installed only in the guide bar 25 in the direction in which the pad 20 is pressed (i.e., the elastic member 27 may be installed only in the backward direction of the pad 20).

Figure 4C:
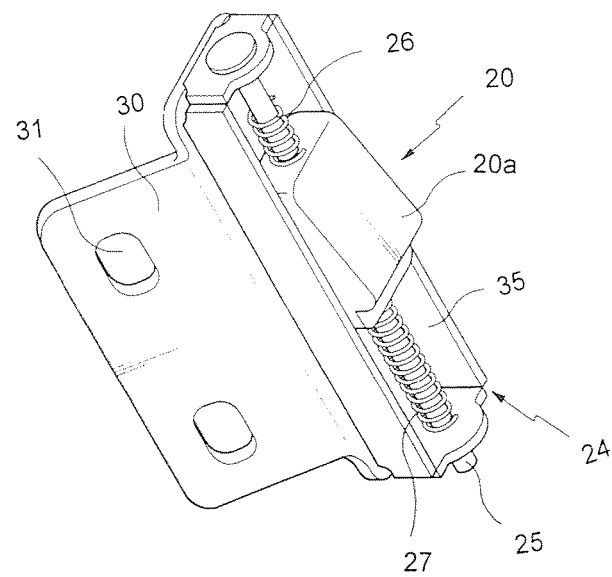
FIG. 4c is an exemplary view illustrating another modified stopper mounted on an operator cab for heavy equipment according to an embodiment of the present invention.

As shown in FIG. 4c, the elastic members 26 and 27 may be installed on the guide bar 25 in the forward and backward directions of the pad 20 in such a manner that the elastic member 26 installed in the forward direction of the pad 20 (i.e., in front of the pad 20 in the X-axis direction) has a strength relatively higher than the elastic member 27 installed in the backward direction of the pad 20 (i.e., in the rear of the pad 20 in the X-axis direction), and may be installed on a part of the guide bar 25 in the forward direction of the pad 20. That is, the elastic member 27 has a low strength, and thus the sliding door 3 can be opened by a small force.

The elastic force of the elastic members 26 and 27 installed on the guide bar 25 in a limited space between the cab 2 and the sliding door 3 can be easily adjusted. That is, a tension coil spring may be used as the elastic member 26 installed on the guide bar 25 in front of the pad 20, and a compression coil spring may be used as the elastic member 27 installed on the guide bar 25 in the rear of the pad 20.

On the other hand, a compression coil spring may be used as the elastic member 26 installed on the guide bar 25 in front of the pad 20, and a tension coil spring may be used as the elastic member 27 installed on the guide bar 25 in the rear of the pad 20.

The case 24 includes a pair of partition members 35, formed to correspond to the right and left directions of the case 24 around the guide bar 25, for guiding the rectilineal movement of the pad 20 in the X-axis direction if any one of the upper pad 7d, the first and second central pads 9d and 9e, and the first and second lower pads 8d and 8e becomes in surface contact with the pad 20 due to the movement of the sliding door 3.

The upper, central, and lower stoppers 21, 22, and 23 are installed on the outer sidewall 2a in a state that the number of the upper, central, and lower stoppers 21, 22, and 23 corresponds to the number of the upper, central, and lower rollers 7, 9, and 8.

The upper stopper 21, as shown in FIGS. 5, 6a, 6b, and 11, is installed to press the upper pad 7d in X and Y-axis directions through the surface contact with the pad 20, when the sliding door 3 is fully opened, to prevent the sliding door 3 from rocking in the X and Y-axis directions.

The lower stopper 23, as shown in FIGS. 5, 8a, 8b, and 11, includes a first lower stopper 23a installed to press the first lower pad 8d in the X and Z-axis directions through the surface contact with the pad 20, when the sliding door 3 is fully opened, to prevent the sliding door 3 from rocking in the X and Z-axis directions; and a second lower stopper 23b installed to press the second lower pad 8e in the X and Y-axis directions through the surface contact with the pad 20, when the sliding door is fully opened, to prevent the sliding door 3 from rocking in the X and Y-axis directions.

Figure 7A:
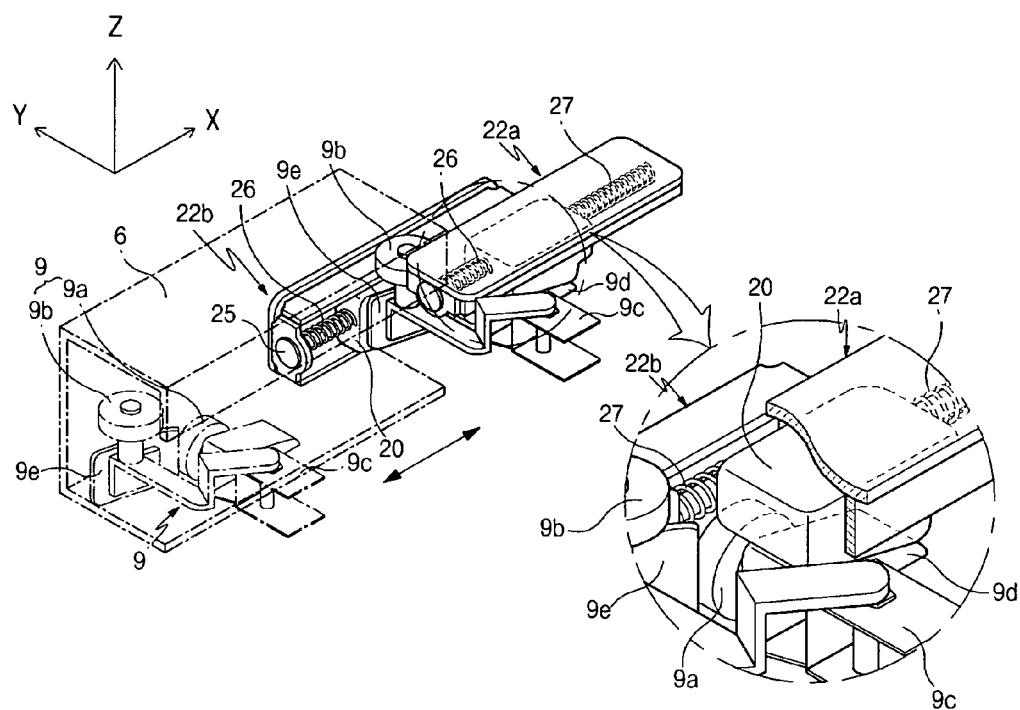
FIG. 7a is a view explaining the use of a central stopper shown in FIG. 11.
Figure 7B:
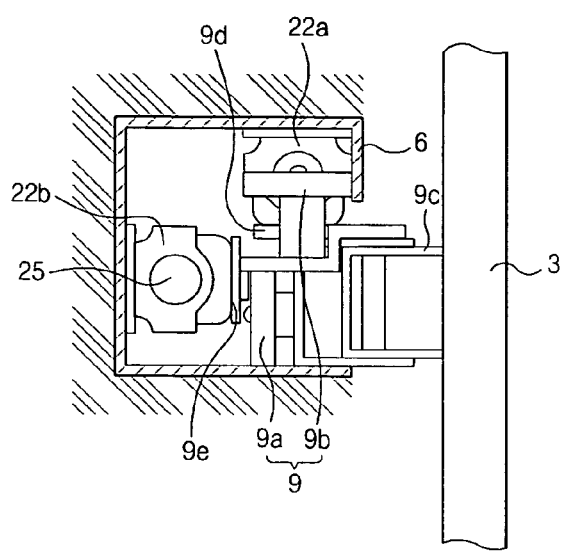
FIG. 7b is a side view of the central stopper shown in FIG. 11.
Figure 11:
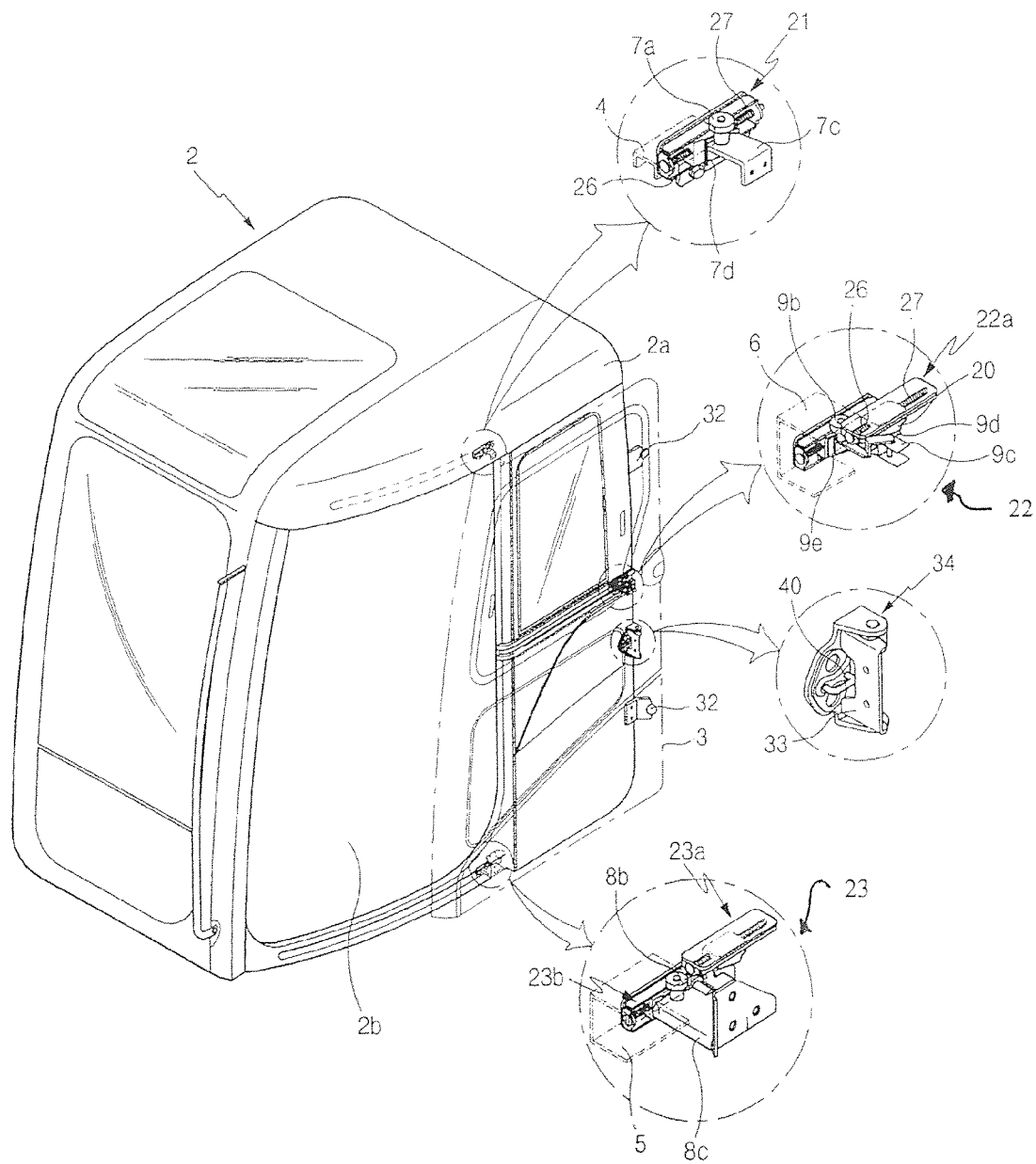
FIG. 11 is a perspective view of an operator cab for heavy equipment according to another embodiment of the present invention.

The central stopper 22, as shown in FIGS. 7a, 7b, and 11, includes a first central stopper 22a installed to press the first central pad 9d in the X and Z-axis directions through the surface contact with the pad 20, when the sliding door 3 is fully opened, to prevent the sliding door 3 from rocking in the X and Z-axis directions; and a second central stopper 22b installed to press the second central pad 9e in the X and Y-axis directions through the surface contact with the pad 20, when the sliding door 3 is fully opened, to prevent the sliding door 3 from rocking in the X and Y-axis directions.

The upper stopper 21 is installed at an inner end portion of the upper rail 4 of the opened position in which the sliding door is fully opened, the central stopper 22 is installed at an inner end portion of the central rail 6 of the opened position in which the sliding door is fully opened, and the lower stopper 23 is installed at an inner end portion of the lower rail 5 of the opened position in which the sliding door is fully opened.

Figure 10A:
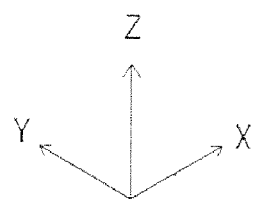
FIG. 10a is a view explaining the fixing of the stopper shown in FIG. 4 through movement of the fixing position thereof in an X-axis direction.
Figure 10A:
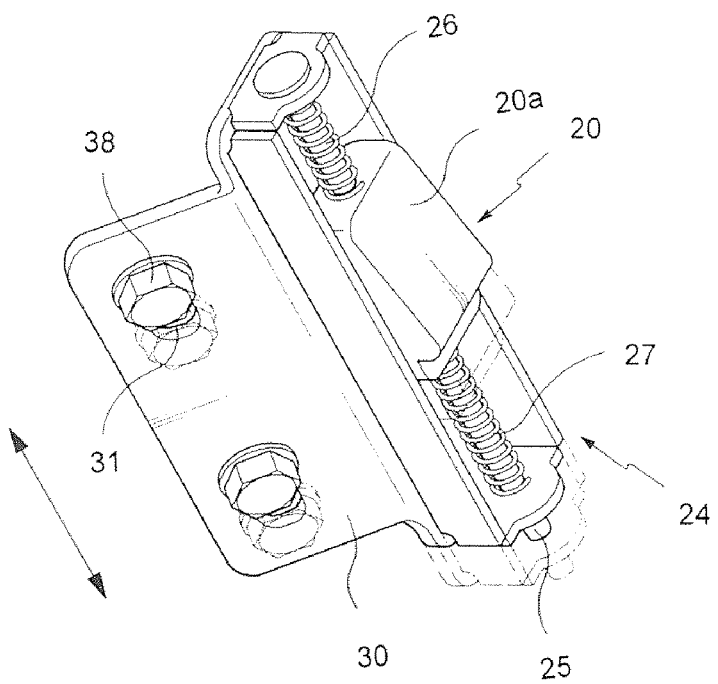
Figure 10B:
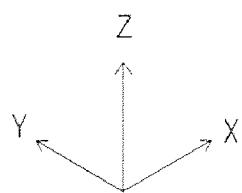
FIG. 10b is a view explaining the fixing of the stopper shown in FIG. 4 through movement of the fixing position thereof in a Z-axis direction.
Figure 10B:
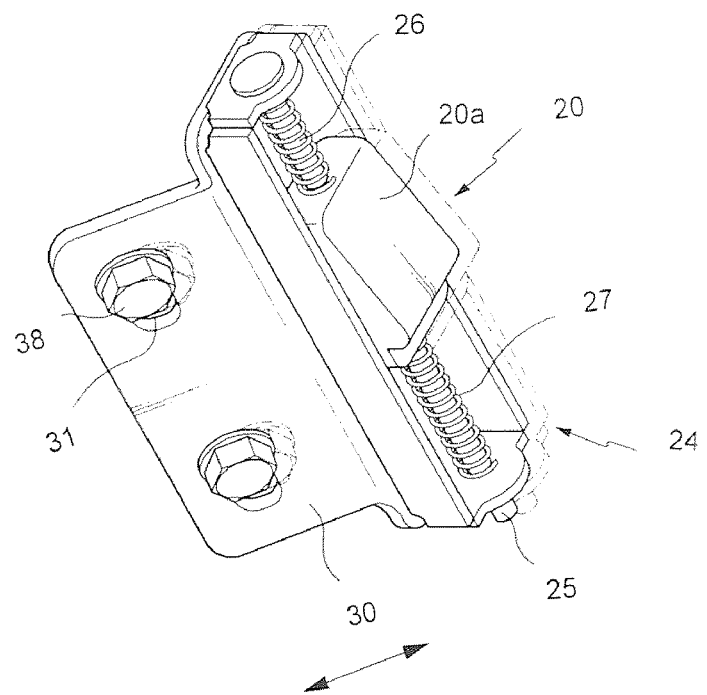

As shown in FIGS. 10a and 10b, the case 24 is provided with a bracket 30 for fixing the case to the outer sidewall 2a, which has circular or elongated fastening holes 31 formed thereon, so that any one of the upper, central, and lower stoppers 21, 22, and 23 is moved in the X or Z-axis direction against the outer sidewall 2a to fix the stoppers to the outer sidewall when the manufacturing deviation occurs between the operator cab 2 and the sliding door 3 or the pads 20 are worn away due to their prolonged use.

Figure 5:
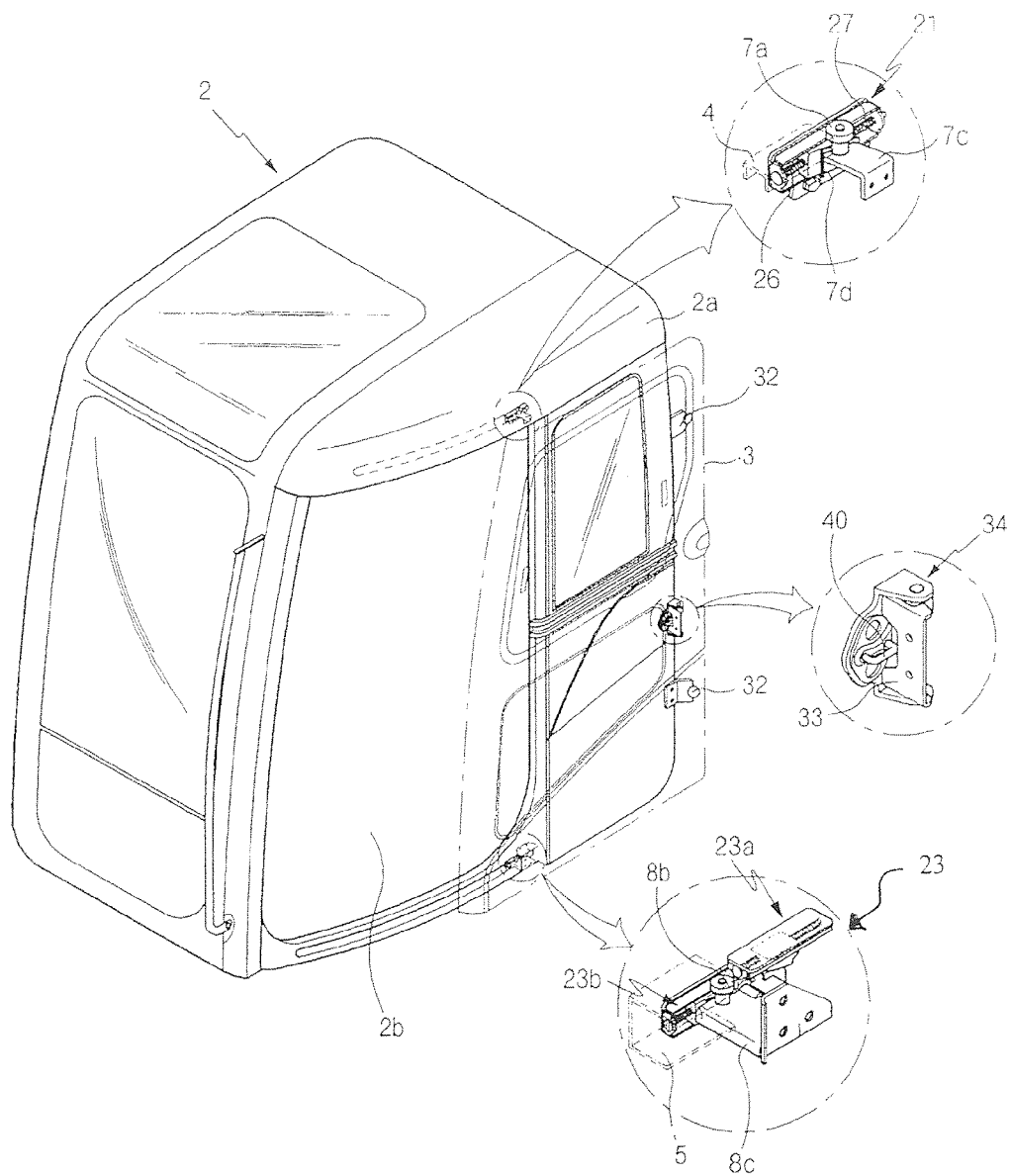
FIG. 5 is a perspective view of an operator cab having stoppers mounted thereon according to an embodiment of the present invention.
Figure 6A:
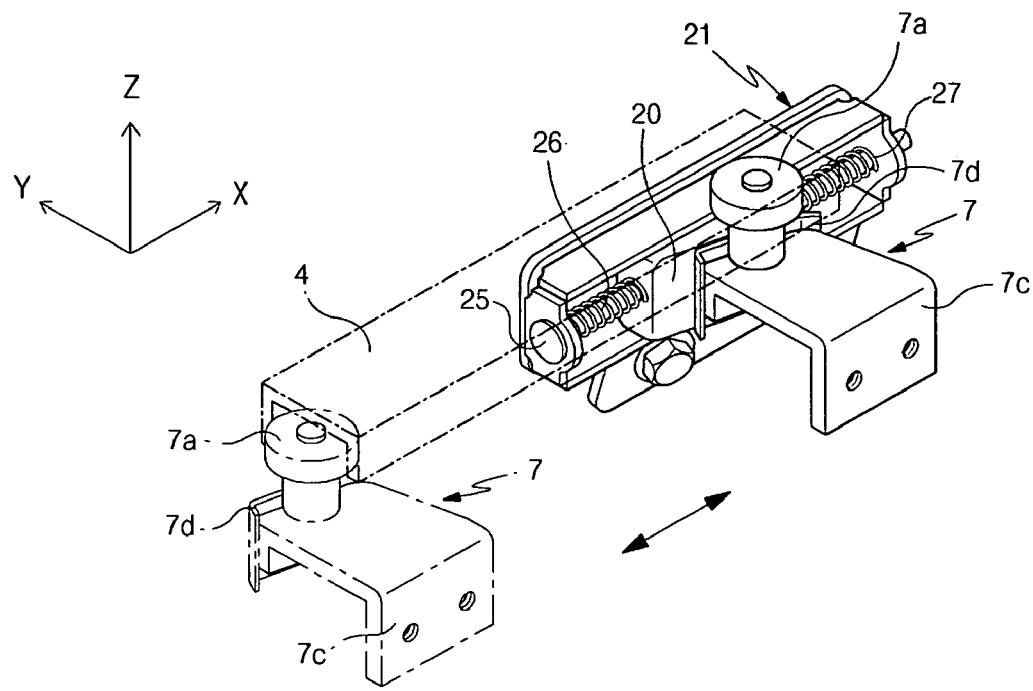
FIG. 6a is a view explaining the use of an upper stopper shown in FIG. 5.
Figure 6B:
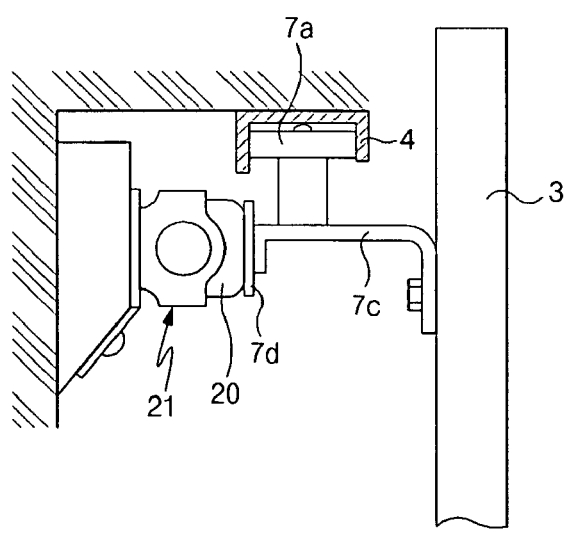
FIG. 6b is a side view of the upper stopper shown in FIG. 5.

As shown in FIGS. 5, 6a and 6b, the upper roller 7 includes a guide roller 7a that is rotated in the Y-axis direction along the upper rail 4 when the sliding door 3 is opened or closed.

As shown in FIGS. 7a, 7b and 11, the central roller 9 includes a first central roller (i.e., a rolling roller 9a) that is rotated in the X-axis direction along the center rail 6, when the sliding door 3 is opened or closed, to support the load of the sliding door 3, and a second central roller (i.e., a guide roller 9b) that is rotated in the Y-axis direction, when the sliding door 3 is opened or closed, to prevent the sliding door 3 from seceding from the central rail 6.

Figure 8A:
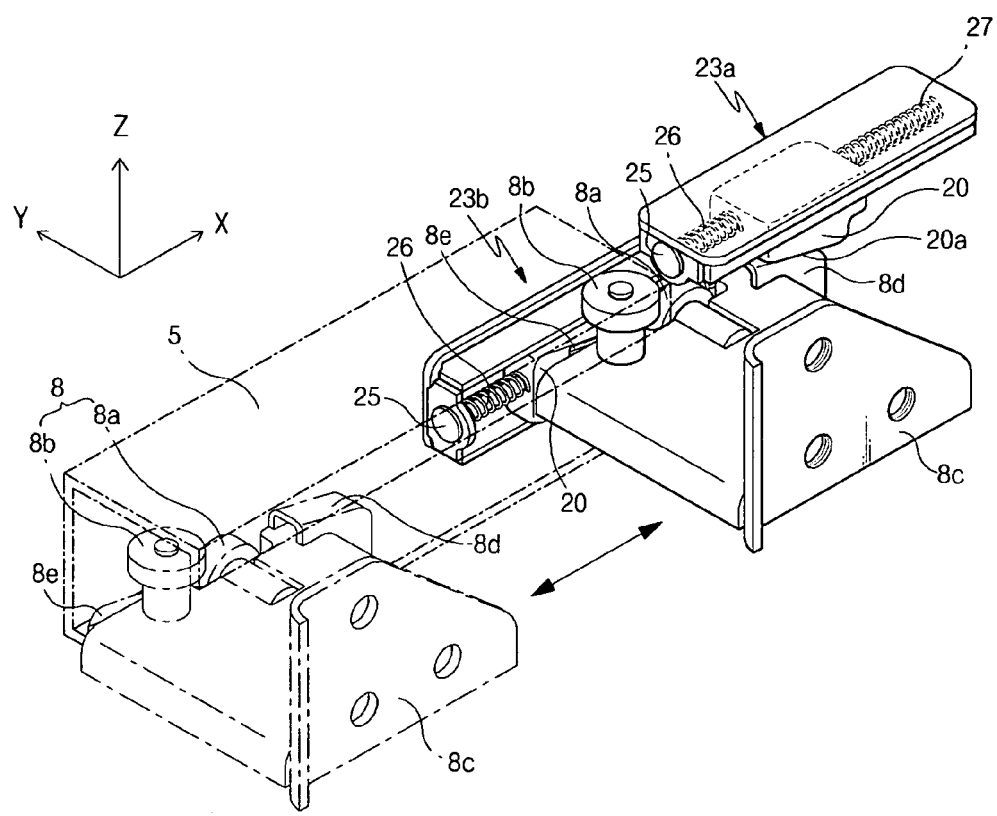
FIG. 8a is a view explaining the use of a lower stopper shown in FIG. 5.
Figure 8B:
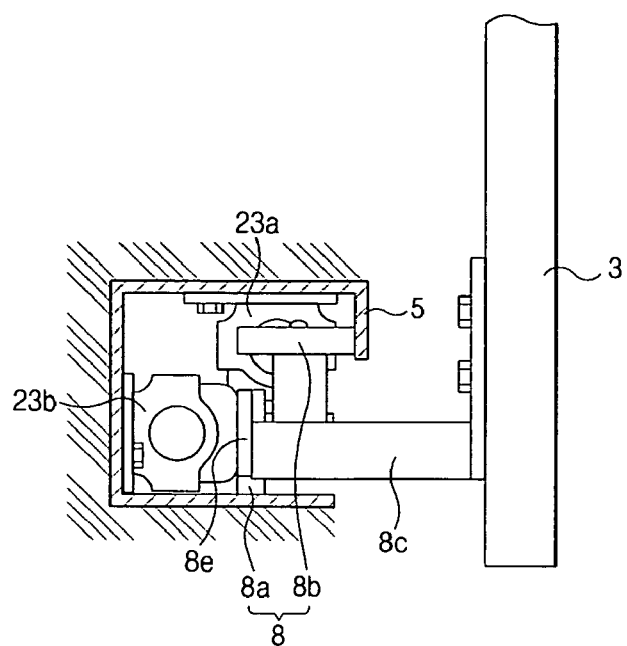
FIG. 8b is a side view of the lower stopper shown in FIG. 5.

As shown in FIGS. 5, 8a and 8b, the lower roller 8 includes a first lower roller (i.e., a rolling roller 8a) that is rotated in the X-axis direction along the lower rail 5, when the sliding door 3 is opened or closed, to support the load of the sliding door 3, and a second lower roller (i.e., a guide roller 8b) that is rotated in the Y-axis direction along the lower rail 5, when the sliding door 3 is opened or closed, to prevent the sliding door 3 from seceding from the lower rail 5.

Hereinafter, the operation of the operator cab for heavy equipment according to an embodiment of the present invention will be described with reference to the accompanying drawings.

As shown in FIGS. 4a, 4b, 4c, 5, 6a, 6b, 8a, 8b, and 9, in the case where the sliding door 3 is slid in the backward direction of the cab 2 (i.e., to a position that gets away from the doorway 2b) by an operator to open the sliding door 3, the upper rollers 7 and 7a and the lower rollers 8, 8a, and 8b provided on the upper and lower portions of the sliding door 3 are slid along the upper and lower rails 4 and 5 provided on the outer sidewall 2a, and thus the sliding door 3 is opened (as shown with the dotted line in FIG. 5).

At this time, since the opened sliding door 3 is positioned within the swing radius of the operator cab 2, the sliding door 3 does not interfere with buildings or trees adjacent to the working site even when the upper swivel structure swings on a narrow alley of a downtown area in a state that the sliding door 3 is opened.

As shown in FIGS. 6a and 6b, the rocking or rattling of the sliding door 3 in the X or Y-axis direction can be suppressed by pressing the upper pad 7d formed on the upper bracket 7c through the surface contact with the pad 20 of the upper stopper 21.

When the sliding door 3 is moved to the opened position in which the sliding door 3 is fully opened, the upper pad 7d becomes in surface contact with the slant surface 20a of the pad 20 of the upper stopper 21, and thus cannot move any further in the X-axis direction (i.e., the forward/backward direction of the cab 2, or the direction in which the sliding door 3 is opened).

Due to the surface contact with the upper pad 7*d*, the pad 20 is moved forward or backward along the guide bar 25 to produce a displacement in the X-axis direction. In this case, a compressive force acts on the elastic member 27 installed in the rear of the pad 20, and a tensile force acts on the elastic member 26 installed in the front of the pad 20, as shown in the drawing.

The pad 20 is fixed by the elastic restoring forces of the elastic members 26 and 27 elastically installed in the guide bar 25 of the upper stopper 21. Since the guide roller 7*a* is pressed in the X-axis direction (i.e., the forward/backward direction of the cab 2) by the structure of the slant surface 20*a* of the fixed pad 20 as shown in the drawing, the sliding door 3 is prevented from rocking or rattling in the X-axis direction.

Simultaneously, since the guide roller 7*a* of the upper roller 7 is pressed in the Y-axis direction (i.e., the right/left direction of the cab 2) through the surface contact with the fixed pad 20 as shown in the drawing, the sliding door 3 is prevented from rocking or rattling in the Y-axis direction.

When the sliding door 3 is opened, the contact area of the pad 20 and the upper pad 7*d* is increased through their mutual surface contact, and thus the fixing force of the sliding door 3 is increased. Also, by dispersing the load applying to the upper roller 7, the wear or damage of the upper roller 7 is reduced.

Accordingly, in the case of moving the sliding door 3 to the opened position in which the sliding door is fully opened, the upper pad 7*d* is pressed in the X and Y-axis directions through the surface contact with the pad 20 of the upper stopper 21, and thus the sliding door 3 is prevented from rocking or rattling in the X and Y-axis directions.

As shown in FIGS. 5, 8*a* and 8*b*, by pressing the first and second lower pads 8*d* and 8*e* through the surface contact with the pad 20 of the lower stopper 23, the sliding door 3 can be prevented from rocking or rattling in the X, Y, or Z-axis direction.

When the sliding door 3 is moved to the opened position in which the sliding door 3 is fully opened, the first lower pad 8*d* becomes in surface contact with the slant surface 20*a* of the pad 20 of the first lower stopper 23*a*, and thus cannot move any further in the X-axis direction (i.e., the forward/backward direction of the cab 2, or the direction in which the sliding door 3 is opened).

Due to the surface contact with the first lower pad 8*d*, the pad 20 is moved in the X-axis direction along the guide bar 25 to produce a displacement in the X-axis direction. In this case, the position of the pad 20 is determined by the elastic restoring forces of the pair of elastic members 26 and 27 installed on right and left portions of the pad 20.

Since the first lower pad 8*d* is pressed in the X-axis direction (i.e., the forward/backward direction of the cab 2) by the structure of the slant surface 20*a* of the fixed pad 20 as shown in the drawing, the sliding door 3 is prevented from rocking or rattling in the X-axis direction.

Simultaneously, since the first lower pad 8*d* is pressed in the Z-axis direction (i.e., the upward/downward direction of the cab 2) through the surface contact with the fixed pad 20, the sliding door 3 is prevented from rocking or rattling in the Z-axis direction.

On the other hand, the second lower pad 8*e* becomes in surface contact with the slant surface 20*a* of the pad 20 of the second lower stopper 23*b*, and thus cannot move any further in the X-axis direction (i.e., the forward/backward direction of the cab 2).

Due to the surface contact with the second lower pad 8*e*, the pad 20 is moved in the X-axis direction along the guide bar 25 to produce a displacement in the X-axis direction. In this case, the position of the pad 20 is determined by the elastic restoring forces of the pair of elastic members 26 and 27 installed on right and left portions of the pad 20.

Since the second lower pad 8*e* is pressed in the X-axis direction (i.e., the forward/backward direction of the cab 2) by the structure of the slant surface 20*a* of the fixed pad 20 as shown in the drawing, the sliding door 3 is prevented from rocking or rattling in the X-axis direction.

Simultaneously, since the second lower pad 8*e* is pressed in the Y-axis direction (i.e., the right/left direction of the cab 2) through the surface contact with the fixed pad 20, the sliding door 3 is prevented from rocking or rattling in the Y-axis direction.

Accordingly, in the case of fully opening the sliding door 3, the first lower pad 8*d* is pressed in the X and Z-axis directions through the surface contact with the pad 20 of the first lower stopper 23*a*, and thus the sliding door 3 is prevented from rocking or rattling in the X and Z-axis directions. Simultaneously, the second lower pad 8*e* is pressed in the X and Y-axis directions through the surface contact with the pad 20 of the second lower stopper 23*b*, and thus the sliding door 3 is prevented from rocking or rattling in the X and Y-axis directions.

Figure 9:
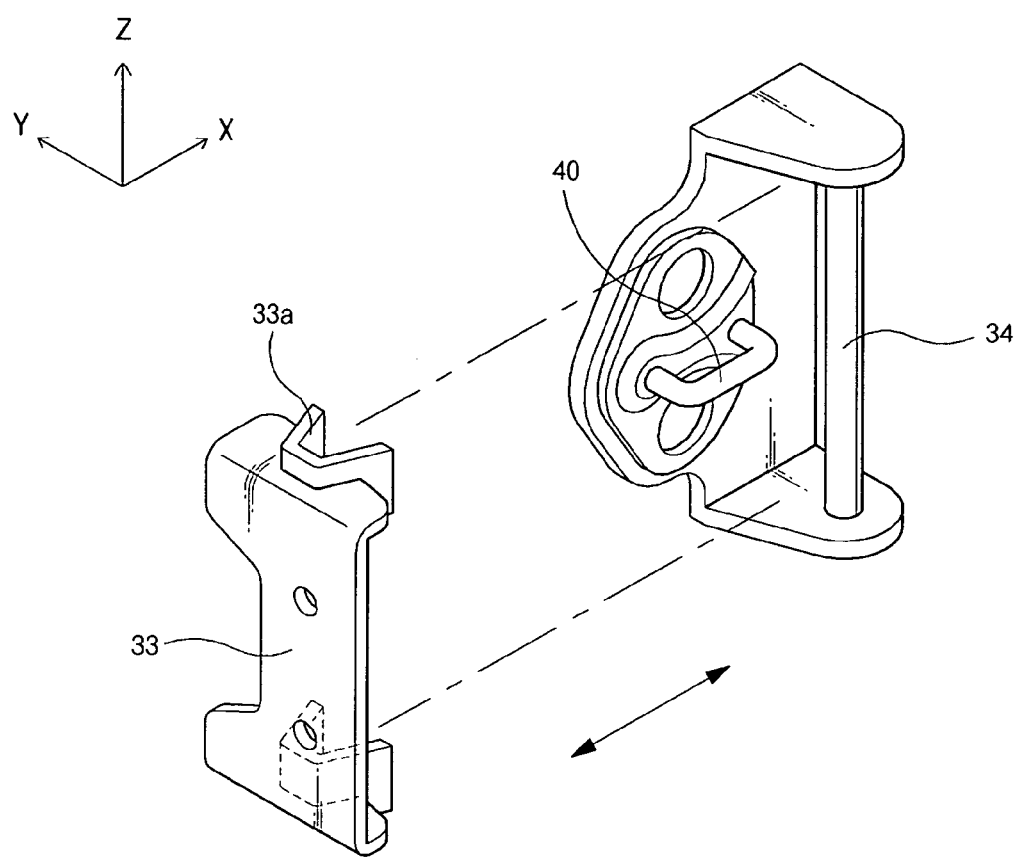
FIG. 9 is an illustrative perspective view of main parts of a stopper bar holder and a stopper bar shown in FIG. 5.

As shown in FIG. 9, when the sliding door 3 is moved to the opened position where the sliding door 3 is fully opened, the engaging member 33*a* of the stopper bar holder 33, which is made of a plastic material and is installed on the inner surface of the sliding door 3 in the position that gets away from the doorway 2*b*, is engaged with the stopper bar 34 installed on the outer sidewall 2*a*.

Accordingly, the stopper bar 34 is locked into the stopper bar holder 33 in the opened position where the sliding door 3 is fully opened, and thus the sliding door 3 is prevented from rocking or rattling in the X and Y-axis directions as shown in the drawing.

When the stopper bar 34 is engaged with the stopper bar holder 33, the sliding door 3 can be locked in the position where the sliding door 3 is fully opened by locking the lock striker 40 installed adjacent to the stopper bar 34 into a locking plate (not illustrated) installed adjacent to the stopper bar holder 33.

In addition, when the sliding door 3 is moved to the opened position where the sliding door 3 is fully opened, the outer surface of the sliding door 3 becomes in close contact with the supporters 32 installed on the upper and lower portions of the outer sidewall 2*a*. Accordingly, the sliding door 3 is prevented from rocking or rattling in the Y-axis direction.

As shown in FIGS. 4, 6*a*, 6*b*, 7*a*, 7*b*, 8*a*, 8*b*, and 11 (according to another embodiment of the present invention), in the case where the sliding door 3 is moved to the fully-opened position along the upper, central, and lower rails 4, 6, and 5, the upper pad 7*d*, the first and second central pads 9*d* and 9*e*, and the first and second lower pads 8*d* and 8*e* of the sliding door 3 become in surface contact with the slant surfaces of the respective pads 20 of the upper stopper 21, the central stoppers 22, 22*a* and 22*b*, and the lower stoppers 23, 23*a* and 23*b* installed on the upper, central, and lower portions of the outer sidewall 2*a*.

In this case, the upper and lower stoppers 21 and 23 are applied in the same manner as those in one embodiment of the present invention, the detailed description thereof will be omitted.

As shown in FIGS. 7*a* and 7*b* and 11, by pressing the first and second central pads 9*d* and 9*e* through the surface contact with the pad 20 of the central stopper 22, the sliding door 3 can be prevented from rocking or rattling in the X, Y, and Z-axis directions.

When the sliding door 3 is moved to the opened position in which the sliding door 3 is fully opened, the first central pad 9d becomes in surface contact with the slant surface 20a of the pad 20 of the first central stopper 22a, and thus cannot move any further in the X-axis direction (i.e., the forward/backward direction of the cab 2, or the direction in which the sliding door 3 is opened).

Due to the surface contact with the first central pad 9d, the pad 20 is moved in the X-axis direction along the guide bar 25 to produce a displacement in the X-axis direction. In this case, the position of the pad 20 is determined by the elastic restoring forces of the pair of elastic members 26 and 27 installed on the forward and backward portions of the pad 20.

Since the first central pad 9d is pressed in the X-axis direction (i.e., the forward/backward direction of the cab 2) by the structure of the slant surface 20a of the fixed pad 20 as shown in the drawing, the sliding door 3 is prevented from rocking or rattling in the X-axis direction.

Simultaneously, since the first central pad 9d is pressed in the Z-axis direction (i.e., the upward/downward direction of the cab 2) through the surface contact with the fixed pad 20, the sliding door 3 is prevented from rocking or rattling in the Z-axis direction.

On the other hand, the second central pad 9e becomes in surface contact with the slant surface 20a of the pad 20 of the second central stopper 22b, and thus cannot move any further in the X-axis direction (i.e., the forward/backward direction of the cab 2, or the direction in which the sliding door 3 is opened).

Due to the surface contact with the second central pad 9e, the pad 20 is moved in the X-axis direction along the guide bar 25 to produce a displacement in the X-axis direction. In this case, the position of the pad 20 is determined by the elastic restoring forces of the pair of elastic members 26 and 27 installed on the forward and backward portions of the pad 20.

Since the second central pad 9e is pressed in the X-axis direction (i.e., the forward/backward direction of the cab 2) by the structure of the slant surface 20a of the fixed pad 20 as shown in the drawing, the sliding door 3 is prevented from rocking or rattling in the X-axis direction.

Simultaneously, since the central pad 9e is pressed in the Y-axis direction (i.e., the right/left direction of the cab 2) through the surface contact with the fixed pad 20, the sliding door 3 is prevented from rocking or rattling in the Y-axis direction.

Accordingly, in the case of fully opening the sliding door 3, the first central pad 9d is pressed in the X and Z-axis directions through the surface contact with the pad 20 of the first central stopper 22a, and thus the sliding door 3 is prevented from rocking or rattling in the X and Z-axis directions. Simultaneously, the second central pad 9e is pressed in the X and Y-axis directions through the surface contact with the pad 20 of the second central stopper 22b, and thus the sliding door 3 is prevented from rocking or rattling in the X and Y-axis directions.

As shown in FIGS. 10a and 10b, the manufacturing deviation may occur between the outer sidewall 2a and the sliding door 3, or the pad 20, which is made of a plastic material, may be worn away due to the repeated opening/closing of the sliding door 3. In this case, the fixing position of the pads 20 with respect to the upper pad 7d, the first and second central pads 9d and 9e, and the first and second lower pads 8d and 8e can be adjusted in the X or Z-axis direction by minutely adjusting and fixing the position of the fastening members 38 mounted on the outer sidewall 2a, so that any one of the upper, central, and lower stoppers 21, 22, and 23 can be moved and fixed in the X or Z-axis direction against the outer sidewall 2a.

That is, as the bracket 30 has elongated (i.e., slot-shaped) fastening holes 31 that are engaged with the fastening members 38 for fixing the case 24 combined with the pad 20 to the outer sidewall 2a, the position of the case 24 can be adjusted by minutely moving the fastening member 38 in the X-axis direction (as indicated as a dotted line in FIG. 10a) or Z-axis direction (as indicated as a dotted line in FIG. 10b) within the fastening hole 31.

Accordingly, it is always possible to prevent the sliding door 3 from rocking occurring due to a shock or vibration being applied to the cab 2 in a state that the sliding door is fully opened or closed.

In the embodiments of the present invention, an operator cab mounted on the heavy equipment has been exemplified. However, it will be apparent that the present invention can also be applied to a passenger car or a commercial vehicle having sliding doors to prevent the doors from rocking or rattling in X, Y, and Z-axis directions when the car is driven in a state that the doors are closed.

As described above, the operator cab for heavy equipment according to the embodiments of the present invention has the following advantages.

The sliding door mounted on the operator cab is prevented from rocking or rattling in three directions (i.e., X, Y, and Z-axis directions) due to the shock or vibration being applied to the cab in a state that the sliding door is fully opened, and thus an operator can concentrate upon his work.

The fixing force caused by the mutual surface contact between stoppers and pads for preventing the rocking of the sliding door is increased, and the sliding door is prevented from rocking due to the gap between rollers.

The wear of the rollers is reduced by dispersing the load applying to the rollers when the sliding door is fully opened, and the deformation or damage of the corresponding components is prevented.

The fixing position of stoppers can be minutely adjusted when the manufacturing deviation occurs between the cab and the sliding door, or the pad for the stopper is worn away, and thus it is always possible to suppress the rocking of the sliding door in a state that the sliding door is opened or closed.

The structure of stoppers is simplified to reduce the manufacturing cost, and protrusion of the stoppers outside the operator cab is minimized to improve the external appearance of the heavy equipment.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An operator cab for heavy equipment, comprising:
   an outer sidewall having a doorway formed thereon;
   upper and lower rails provided on upper and lower portions of the outer sidewall and engaged with upper and lower rollers, respectively;
   a sliding door being slid by upper and lower rollers that are engaged with the upper and lower rails, respectively, to open or close the doorway;
   an upper pad formed on an upper bracket which is fixed to an inner surface of the sliding door and on which the upper roller is rotatively mounted;

a lower pad formed on a lower bracket which is fixed to the inner surface of the sliding door and on which the lower roller is rotatively mounted;

an upper stopper, installed in the opened position of the outer sidewall in which the sliding door is fully opened, for being in surface contact with the upper pad when the sliding door is fully opened, and preventing the sliding door from rocking by pressure of a pad elastically supported to produce a displacement in an X-axis direction when the upper stopper becomes in surface contact with the upper pad; and a lower stopper, installed in the opened position of the outer sidewall in which the sliding door is fully opened, for being in surface contact with the lower pad when the sliding door is fully opened, and preventing the sliding door from rocking by pressure of a pad elastically supported to produce a displacement in the X-axis direction when the lower stopper becomes in surface contact with the lower pad, wherein at least one of the upper and lower stoppers comprises:
a case mounted on the outer sidewall,
a pad being movably engaged with a guide bar fixed to penetrate the case, and having an upper surface upwardly inclined in a direction in which the sliding door is opened, and
elastic members installed on outer surfaces of the guide bar in forward and backward directions of the pad to fix the sliding door by pressing the pad being in surface contact with any one of the upper and lower pads by elastic restoring forces of the elastic members when the sliding door of the elastic member is fully opened, wherein the elastic members are respectively installed on the guide bar in the backward and forward directions of the pad, and wherein the X-axis direction is a forward-backward direction.

2. The operator cab of claim 1, wherein the number of the upper and lower stoppers installed on the outer sidewall corresponds to the number of the upper and lower rollers.

3. The operator cab of claim 1, wherein the upper stopper is installed to press the upper pad in X and Y-axis directions through the pad, when the sliding door is fully opened, to prevent the sliding door from rocking in the X and Y-axis directions, and wherein the Y-axis direction is a right-left direction.

4. The operator cab of claim 1,
wherein the lower stopper comprises:
a first lower stopper installed to press a first lower pad in X and Z-axis directions through the pad, when the sliding door is fully opened, to prevent the sliding door from rocking in the X and Z-axis directions, and
a second lower stopper installed to press a second lower pad in X and Y-axis directions through the pad, when the sliding door is fully opened, to prevent the sliding door from rocking in the X and Y-axis directions; and
wherein the Y-axis direction is a right-left direction and the Z-axis direction is an up-down direction.

5. The operator cab of claim 1, wherein
the case is provided with a bracket for fixing the case to the outer sidewall, which has elongated fastening holes formed thereon so as to move the upper or lower stoppers in the X or Z-axis direction against the outer sidewall to fix the stopper to the outer sidewall, and the Z-axis direction is an up-down direction.

6. The operator cab of claim 1, wherein the case further comprises a pair of partition members, formed to correspond to the right and left directions of the case around the guide bar, for guiding a rectilineal movement of the pad in the X-axis direction if the upper or lower pad becomes in surface contact with the slant surface of the pad due to the movement of the sliding door.

7. The operator cab of claim 1, wherein the pad is made of a plastic material.

8. The operator cab of claim 1, wherein the upper and lower pads are made of a metallic material.

9. The operator cab of claim 1, wherein the elastic members are installed on the guide bar in a direction in which the pad is pressed.

10. The operator cab of claim 1, wherein the elastic members are installed on the guide bar in the forward and backward directions of the pad in such a manner that the elastic member installed in the forward direction of the pad has a strength relatively higher than the elastic member installed in the backward direction of the pad, and is installed on a part of the guide bar in the forward direction of the pad.

11. The operator cab of claim 1, wherein the elastic member installed on the guide bar in the forward direction of the pad is a tension coil spring, and the elastic member installed on the guide bar in the backward direction of the pad is a compression coil spring.

12. The operator cab of claim 1, wherein the elastic member installed on the guide bar in the forward direction of the pad is a compression coil spring, and the elastic member installed on the guide bar in the backward direction of the pad is a tension coil spring.

13. The operator cab of claim 1, wherein the elastic members are compression coil springs.

14. The operator cab of claim 1, wherein at least one of both ends of the upper or lower pad is bent so that the upper or lower pad smoothly slides when the upper or lower pad becomes in surface contact with the pad.

15. The operator cab of claim 1, wherein the upper stopper is installed at an inner end portion of the upper rail of the opened position in which the sliding door is fully opened, and the lower stopper is installed at an inner end portion of the lower rail of the opened position in which the sliding door is fully opened.

16. The operator cab of claim 1, further comprising a supporter, installed on an upper or lower portion of the outer sidewall, for being in surface contact with the sliding door, when the sliding door is fully opened, to prevent the sliding door from rocking in the X-axis direction.

17. The operator cab of claim 16, wherein the supporter is made of a plastic material.

18. The operator cab of claim 1, further comprising:
a stopper bar holder formed on an inner rear surface of the sliding door;
a stopper bar installed on the outer sidewall, for being engaged with the stopper bar holder when the sliding door is fully opened, and locking the stopper bar holder, when the sliding door is fully opened, to prevent the sliding door from rocking in the X and Y-axis directions; and
a lock striker, installed adjacent to the stopper bar, for being locked when the sliding door is fully opened,
wherein the Y-axis direction is a fight-left direction.

19. The operator cab of claim 18, wherein the stopper bar holder is made of a plastic material.

20. An operator cab for heavy equipment, comprising:
an outer sidewall having a doorway formed thereon;
upper, central, and lower rails provided on upper, central, and lower portions of the outer sidewall and engaged with upper, central, and lower rollers, respectively;

a sliding door being slid by upper, central, and lower rollers that are engaged with the upper, central, and lower rails, respectively, to open or close the doorway;

an upper pad formed on an upper bracket which is fixed to an inner surface of the sliding door and on which the upper roller is rotatively mounted;

a central pad formed on a central bracket which is fixed to the inner surface of the sliding door and on which the central roller is rotatively mounted;

a lower pad formed on a lower bracket which is fixed to the inner surface of the sliding door and on which the lower roller is rotatively mounted;

an upper stopper, installed in the opened position of the outer sidewall in which the sliding door is fully opened, for being in surface contact with the upper pad when the sliding door is fully opened, and preventing the sliding door from rocking by pressure of a pad elastically supported to produce a displacement in an X-axis direction when the upper stopper becomes in surface contact with the upper pad;

a central stopper, installed in the opened position of the outer sidewall in which the sliding door is fully opened, for being in surface contact with the central pad when the sliding door is fully opened, and preventing the sliding door from rocking by pressure of a pad elastically supported to produce a displacement in the X-axis direction when the central stopper becomes in surface contact with the central pad; and a lower stopper, installed in the opened position of the outer sidewall in which the sliding door is fully opened, for being in surface contact with the lower pad when the sliding door is fully opened, and preventing the sliding door from rocking by pressure of a pad elastically supported to produce a displacement in the X-axis direction when the lower stopper becomes in surface contact with the lower pad, wherein the X-axis direction is a forward-backward direction, wherein at least one of the upper, central, and lower stoppers comprises:

a case mounted on the outer sidewall;

a pad being movably engaged with a guide bar fixed to penetrate the case, and having an upper surface upwardly inclined in a direction in which the sliding door is opened; and elastic members installed on outer surfaces of the guide bar in forward and backward directions of the pad to fix the sliding door by pressing the pad being in surface contact with any one of the upper, central, and lower pads by their elastic restoring forces when the sliding door is fully opened; and wherein the elastic members are respectively installed on the guide bar in the backward and forward directions of the pad.

21. The operator cab of claim 20, wherein the number of the upper, central, and lower stoppers installed on the outer sidewall corresponds to the number of the upper, central, and lower rollers.

22. The operator cab of claim 20, wherein the upper stopper is installed to press the upper pad in X and Y-axis directions through the pad, when the sliding door is fully opened, to prevent the sliding door from rocking in the X and Y-axis directions, and wherein the Y-axis direction is a right-left direction.

23. The operator cab of claim 2, wherein the lower stopper comprises:

a first lower stopper installed to press a first lower pad in X and Z-axis directions through the pad, when the sliding door is fully opened, to prevent the sliding door from rocking in the X and Z-axis directions, and a second lower stopper installed to press a second lower pad in X and Y-axis directions through the pad, when the sliding door is fully opened, to prevent the sliding door from rocking in the X and Y-axis directions; and wherein the Y-axis direction is a fight-left direction and the Z-axis direction is an up-down direction.

24. The operator cab of claim 20, wherein the central stopper comprises:

a first central pad installed to press a first central roller in X and Z-axis directions through the pad, when the sliding door is fully opened, to prevent the sliding door from rocking in the X and Z-axis directions, and a second central stopper installed to press a second central pad in X and Y-axis directions through the pad, when the sliding door is fully opened, to prevent the sliding door from rocking in the X and Y-axis directions; and wherein the Y-axis direction is a fight-left direction and the Z-axis direction is an up-down direction.

25. The operator cab of claim 20, wherein the case is provided with a bracket for fixing the case to the outer sidewall, which has elongated fastening holes formed thereon so as to move at least one of the upper, central, and lower stoppers in the X or Z-axis direction against the outer sidewall to fix the stopper to the outer sidewall, and the Z-axis direction is an up-down direction.

26. The operator cab of claim 20, further comprising a supporter, installed on an upper or lower portion of the outer sidewall, for being in surface contact with the sliding door, when the sliding door is fully opened, to prevent the sliding door from rocking in the X-axis direction.

27. The operator cab of claim 20, further comprising:

a stopper bar holder formed on an inner rear surface of the sliding door;

a stopper bar installed on the outer sidewall, for being engaged with the stopper bar holder when the sliding door is fully opened, and locking the stopper bar holder, when the sliding door is fully opened, to prevent the sliding door from rocking in the X and Y-axis directions; and a lock striker, installed adjacent to the stopper bar, for being locked when the sliding door is fully opened, wherein the Y-axis direction is a fight-left direction.

28. The operator cab of claim 20, wherein the case further comprises a pair of partition members, formed to correspond to the right and left directions of the case around the guide bar, for guiding a rectilineal movement of the pad in the X-axis direction if any one of the upper, central, and lower pads becomes in surface contact with the slant surface of the pad due to the movement of the sliding door.

29. The operator cab of claim 20, wherein the upper, central, and lower pads are made of a metallic material.

30. The operator cab of claim 20, wherein at least one of both ends of the upper, central, or lower pad is bent so that the upper, central, or lower pad smoothly slides when the upper, central, or lower pad becomes in surface contact with the pad.

31. The operator cab of claim 20, wherein the upper stopper is installed at an inner end portion of the upper rail of the opened position in which the sliding door is fully opened, the central stopper is installed at an inner end portion of the central rail of the opened position in which the sliding door is fully opened, and the low stopper is installed at an inner end portion of the low rail of the opened position in which the sliding door is fully opened.

* * * * *